Oct. 8, 1946. E. LISOTA 2,408,863
BALED HAY ELEVATOR
Filed Aug. 24, 1945 2 Sheets-Sheet 1

INVENTOR
Edward Lisota
BY
ATTORNEYS

Oct. 8, 1946.  E. LISOTA  2,408,863
BALED HAY ELEVATOR
Filed Aug. 24, 1945  2 Sheets-Sheet 2

INVENTOR
Edward Lisota
BY
ATTORNEYS

UNITED STATES PATENT OFFICE 2,408,863

BALED HAY ELEVATOR

Edward Lisota, Patterson, Calif.

Application August 24, 1945, Serial No. 612,330

8 Claims. (Cl. 198—233)

The present invention is directed to, and it is an object to provide, improvements in a baled hay elevating implement of the type which is adapted to be connected in draft relation alongside a truck onto which the bales are to be stacked; said elevating implement including an upwardly and rearwardly inclined, longitudinally extending elevator, a bale receiving platform at the upper end of said elevator, and drive means for the elevator.

Another object of the present invention is to provide novel drive means for the elevator of a baled hay elevating implement of the type described; such drive means being driven from a supporting wheel of such implement.

An additional object of this invention is to provide drive means, as in the preceding paragraph, which includes a unique lever controlled arrangement whereby the drive for the elevator may be connected or disconnected, selectively; disconnection of the drive means being desirable when the implement is being moved from place to place, and when operation of the elevator is unnecessary.

A further object of the invention is to incorporate, in the drive means for the elevator, a novel overrunning clutch unit mounted so that when the implement is backed up, as working conditions may require at certain times, the drive means for the elevator is not reversed by the resulting reverse rotation of the supporting wheels of the implement.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
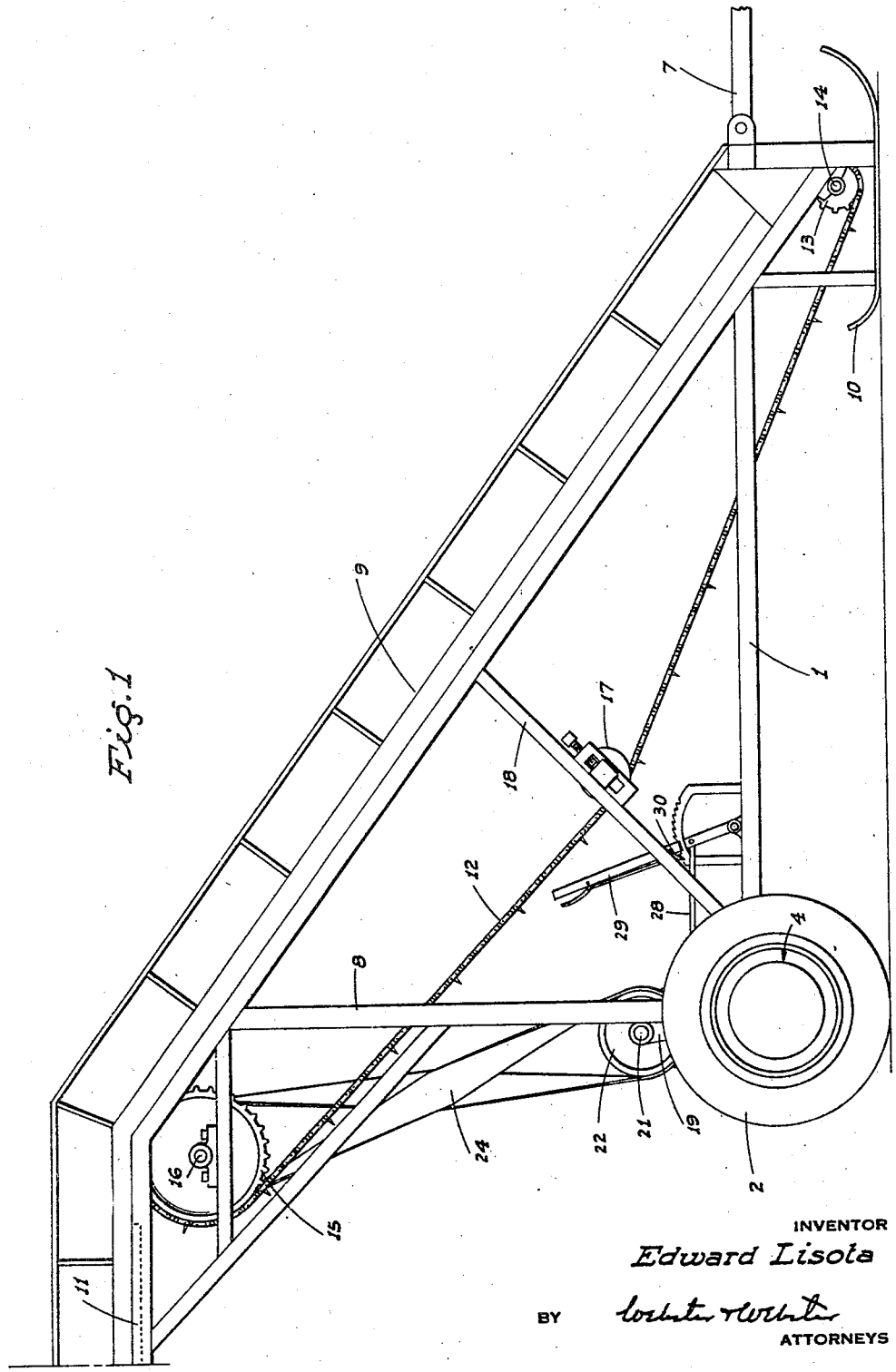
Figure 1 is a side elevation of the improved baled hay elevating implement.

Referring now more particularly to the characters of reference on the drawings, the implement comprises a longitudinally extending, horizontal main frame 1 supported at its rear end for movement along the ground by a pair of transversely spaced wheels 2 mounted on opposite ends of a rotatable axle 3. Each wheel is connected to the axle 3 by means of an overrunning clutch unit, indicated generally at 4, and which will be described hereinafter. The axle 3 is supported from the main frame by means of journals 6.

Adjacent its forward end and to one side thereof the main frame 1 includes a rigid, forwardly projecting tongue 7 adapted to be connected in draft relation to a truck at one side thereof, whereby the implement travels alongside the truck.

At its rear end the main frame 1 includes a rigid upstanding frame assembly 8, and a rearwardly and upwardly inclined elevator 9 extends lengthwise of the implement from the main frame 1 at its forward end to the upstanding frame assembly 8 at its upper end. The lower or forward end of the elevator 9 extends below the main frame 1 to adjacent the ground, for baled hay pick-up; said end of the elevator being supported at the ground by transversely spaced ground engaging members, here shown as skids 10.

At the upper end of the elevator 9 and directly to the rear thereof the upstanding frame assembly 8 supports a horizontal bale receiving platform 11.

The elevator 9 includes a transversely spaced chain-type endless draper 12 which runs at the bottom lower end of the elevator 9 over sprockets 13 carried on a cross shaft 14, and runs at the upper end of said elevator over relatively larger sprockets 15 carried on a cross shaft 16. The cross shaft 16 is journaled in the upstanding frame assembly, as shown. Intermediate the ends of the lower runs of the chains of draper 12, said chains are engaged by combination idler and chain tightening roller units 17 mounted on diagonal braces 18 included in the framing arrangement of the implement.

The drive means for the chain-type endless draper 12 comprises the following:

An upstanding U-shaped yoke 19 is supported, as at 20, on the axle 3, for swinging movement lengthwise of the direction of travel of the implement, and at its upper end said yoke carries a cross shaft 21 on which a flat faced pulley 22 is mounted. Another flat faced pulley 23 is secured on the cross shaft 16 of the elevator 9 in alinement in a vertical plane above the pulley 22. The pulley 22 is disposed slightly ahead of the pulley 23. A flat, endless belt 24 extends between the pulleys 22 and 23, and said belt is crossed, intermediate its ends, in order to reverse the drive between the cross shaft 21 and the cross shaft 16.

At its outer end the cross shaft 21 is fitted with a sprocket 25 driven by an endless chain 26 from another and relatively larger sprocket 27 fixed on the axle 3 between the yoke 19 and adjacent journal 6.

Swinging motion of the yoke 19 is controlled by a forwardly extending, pivotally connected link 28 which is attached, at its forward end, to a pivotally mounted lever 29 on the main frame 1; said lever being maintained in adjusted positions by a hand released catch unit 30.

When the lever 29 is in the rearward position shown in Fig. 1, the yoke 19 is disposed so that the endless belt 24 is loose and no drive is imparted to the elevator 9 thereby, as is desirable for transport of the implement from place to place. However, when the implement is in use the lever 29 is swung forwardly to the belt-tightening position shown in Fig. 2, so that the belt 24 then imparts a drive from pulley 22 to the pulley 23. As the endless belt 24 is crossed, the shaft 16 turns in a direction so that the upper run of the endless draper 12 moves upwardly to convey hay bales from the ground to the bale receiving platform 11. Adjustment of the yoke 19 by the lever 29 between the different positions, as above described, can be accomplished without interfering with the drive arrangement comprised of sprocket 25, chain 26, and sprocket 27, for the reason that said yoke swings about an axis concentric to the latter sprocket; i. e. about the axle 3.

Figure 2:
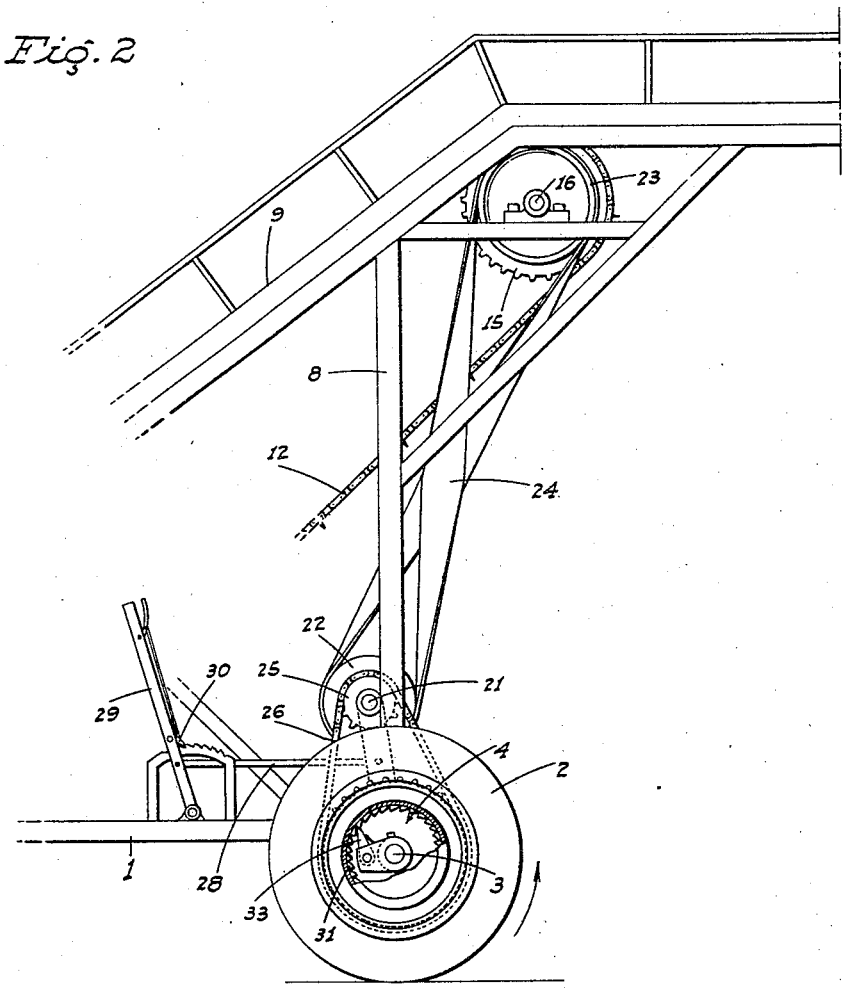
Figure 2 is a fragmentary elevation of the implement, partly in section, taken from the side opposite Figure 1.
Figure 3:
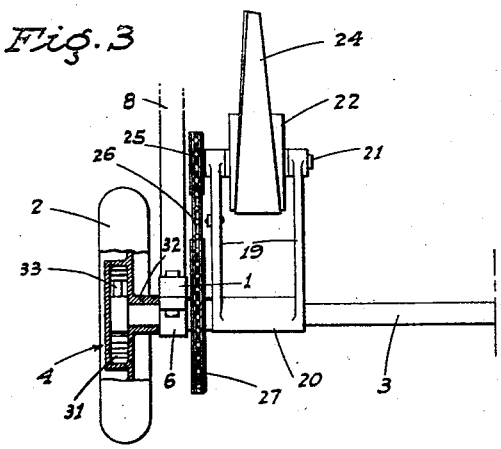
Figure 3 is a fragmentary rear end view, partly in section, showing the drive connections between one of the implement wheels, and the flat endless belt which the drive means for the elevator includes.

In order to prevent the endless draper 12 from being actuated in a reverse direction when the implement is backed up with the truck, the over-running clutch 4 is interposed between each drive wheel 2 and the axle 3, as shown in Figs. 2 and 3; such over-running clutch including an annular, internal ratchet 31 formed with the wheel, and the hub 32 of which wheel is turnable relative to the axle. On the adjacent outer end the axle 3 is fitted with a spring-pressed over-running pawl unit 33 disposed within and cooperating with the annular, internal ratchet 31. The ratchet 31 and the pawl unit 33 cooperate so that the wheel drives the axle 3 when the implement is moving forwardly, but so that said pawl unit 33 overruns relative to the ratchet 31 when the implement moves backward. As a result no drive can be imparted to the draper 12 upon backward movement of the implement.

The above described implement is sturdy and practical, although simple in its structure and operation; the implement requiring little maintenance or repair.

When the implement is in use, and upon advance thereof with a truck, bales of hay are engaged and elevated by the draper 12, and thence discharge onto the horizontal platform 11. From the platform the bales drop onto the truck moving behind the machine.

From the foregoing description it will be seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. Drive mechanism for a baled hay elevating implement which includes an upwardly inclined endless draper mounted on a wheel supported frame, said mechanism comprising an axle driven from one wheel of the implement, an upstanding member mounted for swinging movement lengthwise of the implement about said axle as an axis, a cross shaft journaled on and movable with said member, an endless drive assembly between the axle and said cross shaft, the member being swingable without interfering with said endless drive assembly, an endless belt drive assembly between the cross shaft and the draper adjacent the upper end of the latter, and means to adjustably position said member whereby to place said endless belt drive assembly in or out of operation, selectively.

2. Drive mechanism for a baled hay elevating implement which includes an upwardly inclined endless draper mounted on a wheel supported frame, said mechanism comprising an axle driven from one wheel of the implement, an upstanding member mounted for swing movement lengthwise of the implement about said axle as an axis, a cross shaft journaled on and movable with said member, an endless drive assembly between the axle and said cross shaft, the member being swingable without interfering with said endless drive assembly, an endless belt drive assembly between the cross shaft and the draper adjacent the upper end of the latter, and means to adjustably position said member whereby to place said endless belt drive assembly in or out of operation, selectively; said member being a generally U-shaped yoke, and said cross shaft being mounted on the yoke at its upper end, the endless belt drive assembly including a pulley on the shaft between the legs of the yoke.

3. Drive mechanism for a baled hay elevating implement which includes an upwardly inclined endless draper mounted on a wheel supported frame, said mechanism comprising an axle driven from one wheel of the implement, an upstanding member mounted for swing movement lengthwise of the implement about said axle as an axis, a cross shaft journaled on and movable with said member, an endless drive assembly between the axle and said cross shaft, the member being swingable without interfering with said endless drive assembly, an endless belt drive assembly between the cross shaft and the draper adjacent the upper end of the latter, and means to adjustably position said member whereby to place said endless belt drive assembly in or out of operation, selectively; said endless belt drive assembly comprising a flat faced pulley on the cross shaft, another flat faced pulley disposed thereabove in driving relation to the draper, and a flat, endless belt extending between and about said pulleys.

4. Drive mechanism for a baled hay elevating implement which includes an upwardly inclined endless draper mounted on a wheel supported frame, said mechanism comprising an axle driven from one wheel of the implement, an upstanding member mounted for swing movement lengthwise of the implement about said axle as an axis, a cross shaft journaled on and movable with said member, an endless drive assembly between the axle and said cross shaft, the member being swingable without interfering with said endless drive assembly, an endless belt drive assembly between the cross shaft and the draper adjacent the upper end of the latter, and means to adjustably position said member whereby to place said endless belt drive assembly in or out of operation, selectively; said endless belt drive assembly comprising a flat faced pulley on the cross shaft, another flat faced pulley disposed thereabove in driving relation to the draper, and a flat endless belt extending between and about said pulleys, said belt being crossed between the pulleys so as to reverse the drive between said one wheel and the draper.

5. Drive mechanism for a baled hay elevating implement which includes an upwardly inclined endless draper mounted on a wheel supported frame; said mechanism comprising an axle driven from one wheel of the implement, an upstanding, forwardly facing yoke journaled at its lower end on the axle for swinging movement lengthwise of the implement, a cross shaft journaled on the yoke at its upper end, a sprocket on one end of the cross shaft to one side of the yoke, a complementary sprocket on the axle, an endless chain extending between and about said sprockets, an endless belt drive assembly between the cross shaft and draper, and means to adjustably position said yoke whereby to place said endless belt drive assembly in or out of operation, selectively.

6. Drive mechanism for a baled hay elevating implement which includes an upwardly inclined endless draper mounted on a wheel supported frame; said mechanism comprising an axle driven from one wheel of the implement, an upstanding, forwardly facing yoke journaled at its lower end on the axle for swinging movement lengthwise of the implement, a cross shaft journaled on the yoke at its upper end, a sprocket on one end of the cross shaft to one side of the yoke, a complementary sprocket on the axle, an endless chain extending between and about said sprockets, an endless belt drive assembly between the cross shaft and draper, and means to adjustably position said yoke whereby to place said endless belt drive assembly in or out of operation, selectively; said means including a pivotally connected link extending from the yoke lengthwise of the implement to a manually adjustable lever on the frame, and a hand released catch unit adapted to maintain the lever in any selected position of adjustment.

7. Drive mechanism for a baled hay elevating implement which includes an upwardly inclined endless draper mounted on a wheel supported frame; said mechanism comprising an axle driven from one wheel of the implement, an upstanding, forwardly facing yoke journaled at its lower end on the axle for swinging movement lengthwise of the implement, a cross shaft journaled on the yoke at its upper end, a sprocket on one end of the cross shaft to one side of the yoke, a complementary sprocket on the axle, an endless chain extending between and about said sprockets, an endless belt drive assembly between the cross shaft and draper, and means to adjustably position said yoke whereby to place said endless belt drive assembly in or out of operation, selectively; said endless belt assembly comprising a pulley on the cross shaft between the legs of the yoke, another pulley disposed thereabove in driving relation to the draper, and an endless belt extending between and about said pulleys.

8. Drive mechanism for a baled hay elevating implement which includes an upwardly inclined endless draper mounted on a wheel supported frame; said mechanism comprising an axle driven from one wheel of the implement, an upstanding, forwardly facing yoke journaled at its lower end on the axle for swinging movement lengthwise of the implement, a cross shaft journaled on the yoke at its upper end, a sprocket on one end of the cross shaft to one side of the yoke, a complementary sprocket on the axle, an endless chain extending between and about said sprockets, an endless belt drive assembly between the cross shaft and draper, and means to adjustably position said yoke whereby to place said endless belt drive assembly in or out of operation, selectively; said endless belt drive assembly comprising a flat faced pulley on the cross shaft between the legs of the yoke, another flat faced pulley disposed thereabove in driving relation to the draper, and a flat, endless belt extending between and about said pulleys.

EDWARD LISOTA.